US009064027B2

(12) United States Patent
Kloba

(10) Patent No.: US 9,064,027 B2
(45) Date of Patent: Jun. 23, 2015

(54) CROSS-ENTERPRISE IT INFORMATION SHARING PLATFORM

(75) Inventor: David Kloba, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 1886 days.

(21) Appl. No.: 12/137,115

(22) Filed: Jun. 11, 2008

(65) Prior Publication Data

US 2008/0313231 A1 Dec. 18, 2008

Related U.S. Application Data

(60) Provisional application No. 60/943,822, filed on Jun. 13, 2007.

(51) Int. Cl.
G06F 17/30 (2006.01)

(52) U.S. Cl.
CPC .................. G06F 17/30905 (2013.01)

(58) Field of Classification Search
USPC .................. 707/608, 793–796, 803
See application file for complete search history.

(56) References Cited

U.S. PATENT DOCUMENTS

| 5,970,243 | A * | 10/1999 | Klein et al. .................. 717/113 |
| 6,993,580 | B2 | 1/2006 | Isherwood et al. |
| 7,051,036 | B2 * | 5/2006 | Rosnow et al. ............... 707/723 |
| 7,096,215 | B2 | 8/2006 | Bates et al. |
| 2004/0243453 | A1 * | 12/2004 | Call et al. .......................... 705/7 |
| 2006/0004839 | A1 * | 1/2006 | Nagasawa et al. ............ 707/102 |
| 2006/0130000 | A1 * | 6/2006 | Miyao et al. .................. 717/128 |
| 2006/0253458 | A1 | 11/2006 | Dixon et al. |
| 2007/0255713 | A1 * | 11/2007 | Li et al. ............................ 707/9 |

OTHER PUBLICATIONS

PCT International Search Report and Written Opinion, PCT/US2008/066598, Sep. 10, 2008, 9 Pages.
Microsoft Computer Dictionary Fourth Edition Published 1999, Microsoft Press, cover pages and pp. 168-169 (5 pages total).

* cited by examiner

Primary Examiner — Debbie Le
(74) Attorney, Agent, or Firm — Baker Botts L.L.P.

(57) ABSTRACT

Scan information is obtained from a scan of a managed endpoint (e.g., a user workstation) in an enterprise environment. The scan information includes information about an endpoint object (e.g., a software program), on the managed endpoint. External information about the endpoint object is received from an information source outside of the enterprise environment. This external information may be provided by an IT information server that communicates with multiple enterprise environments. The scan information and external information is combined to produce integrated information. The integrated information is displayed on a user interface. At least a portion of the integrated information is also sent to a computer outside of the enterprise environment to be shared with users of other enterprise environments.

19 Claims, 6 Drawing Sheets

| | |
|---|---|
| Adobe Acrobat 8 Standard – Software Information | |
| Name: | Adobe Acrobat 8 Standard |
| Publisher: | Adobe Systems |
| Software Version: | 8.0.0 |
| Filename: | acrobat.exe |
| Contact: | Customer Support |
| Information URL: | http://www.adobe.com |
| Help URL: | http://www.adobe.com/support/main.html |
| Readme File: | C:\Program Files\Adobe\Acrobat 8.0\Readme.htm |
| Uninstall Command(s): | msiexec /I {AC76BA86-1033-0000-BA7E-000000000003} |
| Quiet Install Command: | %ACROBAT_INSTALLER_EXE% /s /v/qn |
| Command Line Help: | See Command Line Examples at http://www.adobe.com/cfusion/knowledgebase/index.cfm?id=330817 |
| Description: | Adobe Acrobat 8 Standard software enables business professionals to reliably create, combine, and control Adobe PDF documents for easy, more secure distribution and collaboration. * |
| Software Category: | Business - 75% *<br>Desktop - 25% * |
| Software Threat: | 1 (1 - Safe, 5 - Harmful) * |
| Comments: | None. |

[ Edit information ]

FIG. 5

CROSS-ENTERPRISE IT INFORMATION SHARING PLATFORM

CROSS-REFERENCE TO RELATED APPLICATIONS

This application claims the benefit of U.S. Provisional Application No. 60/943,822, filed Jun. 13, 2007, which is hereby incorporated in its entirety by reference.

FIELD OF THE INVENTION

This invention relates generally to information technology (IT) systems, and more specifically to systems and methods for automating and deploying IT solutions in an enterprise environment.

BACKGROUND OF THE INVENTION

An enterprise environment includes multiple managed endpoints, such as user workstations, switches, and routers. This enterprise environment is managed by management computers operated by information technology (IT) staff. The IT staff perform functions such as installing software on the managed endpoints and otherwise modifying their configurations. The IT staff also collect information about the managed endpoints, such as the software programs installed on the endpoint.

The IT staff often need to know information about the software programs on the endpoints. Software installation and operation techniques can vary based on the configurations of the managed endpoints and the needs of the users in the environment. Some useful techniques may not be documented in the instructions provided with the software programs, but rather are discovered by the IT staff, for example through trial and error. It is also useful to know various undocumented properties of software programs, such as whether a program is spyware or whether a program is known to have defects.

The IT staffs in separate enterprises often discover information about the same software programs through independent efforts. Various web-based message boards and similar systems exist for IT staffs to communicate with each other to share this information and reduce duplicated efforts. However, these systems are often manually intensive and are not well integrated with the management computers used by the IT staffs to perform enterprise management functions. What is needed are systems and methods for automating the sharing of enterprise configuration information between IT staffs and integrating the information sharing with management computers used by the IT staffs.

SUMMARY

The above need is met by a system, method, and computer program product for sharing information technology (IT) information. In an embodiment of the method, scan information is obtained from a scan of a managed endpoint (e.g., a user workstation) in an enterprise environment. The scan information includes information about an endpoint object (e.g., a software program), on the managed endpoint. External information about the endpoint object is received from an information source outside of the enterprise environment. This external information may be provided by an IT information server that communicates with multiple enterprise environments. The scan information and external information is combined to produce integrated information. The integrated information is displayed on a user interface. At least a portion of the integrated information is also sent to a computer outside of the enterprise environment to be shared with users of other enterprise environments.

BRIEF DESCRIPTION OF THE DRAWINGS

FIG. 5 illustrates a portion of a screen displayed to an appliance operator, in one embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE DRAWINGS

Figure 1:
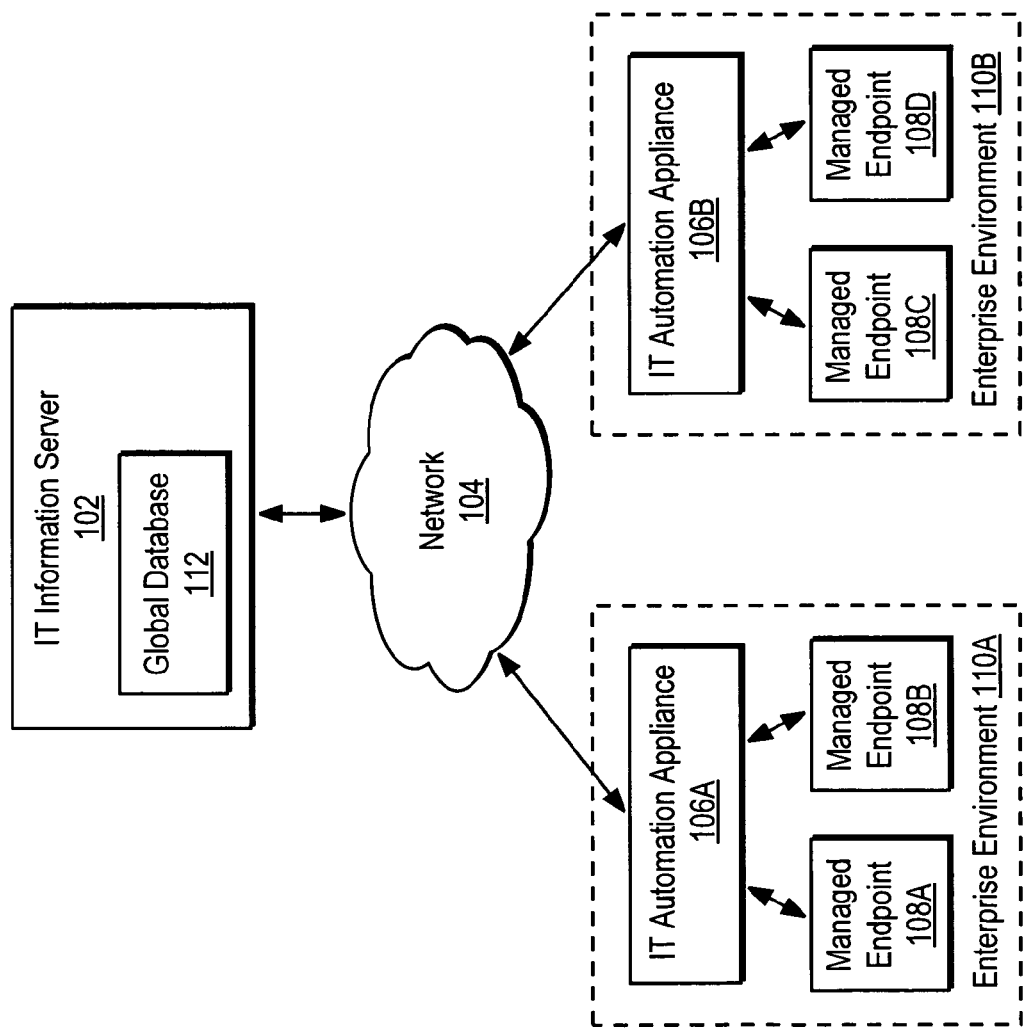
FIG. 1 is a high-level diagram illustrating communication between information technology (IT) automation appliances and an IT information server, in one embodiment.

FIG. 1 is a high-level diagram illustrating communication between information technology (IT) automation appliances 106 (the "appliances") and an IT information server 102, in one embodiment. Each appliance 106A carries out various IT processes in an enterprise environment 110A. An appliance 106A manages one or more managed endpoints 108 within the environment 110A. The managed endpoints 108 are computing devices such as user workstations or routers. FIG. 1 shows only two managed endpoints 112 per environment 108 even though some embodiments may have hundreds or thousands of such endpoints. Additionally, some embodiments may have more than one appliance 106 in an environment 108 and may have significantly more than two appliances 106 communicating with an IT information server 102.

An enterprise environment 110 includes the managed endpoints and appliances 106 used by a particular organization. For example, a business may have an enterprise environment that includes the computers used by employees of the business and managed by an IT staff of the business. A large business or organization may include multiple separately managed enterprise environments corresponding to different office locations or subdivisions. The IT information server 102 communicates with appliances 106 in the enterprise environments 110 but is not a part of any of the enterprise environments. The IT information server 102 enables the sharing of IT information between the various enterprise environments 110. Although only two enterprise environments 110 are shown, there may be many more enterprise environments that share information through the IT information server 102.

An appliance 106A may communicate with its managed endpoints 108 through a network (not shown) such as a company intranet. The appliance 106 is operated by an IT staff of the enterprise environment 110 and is used to perform functions such as installing, operating, monitoring, or configuring processes, software programs, startup programs, and services on the managed endpoints 108. These processes, software programs, startup programs, and services are collectively referred to as "endpoint objects". Startup programs are programs configured to run when the managed endpoint 108 boots up, in one embodiment. Services are special background processes configured to run on the managed endpoint 108 that may or may not be currently running.

The appliances 106 communicate with the IT information server 102 through a network 104 such as the Internet. The appliances 106 share IT information with each other through the IT information server 102. This IT information includes information about installing, operating, and configuring the endpoint objects on the managed endpoints 108. This information can also include undocumented information about endpoint objects such as various defects in the objects or whether the objects contain spyware. Often, discovering this information requires time and effort by the IT staff. By sharing this information between enterprise environments 110, IT staffs can benefit from the efforts of other IT staffs. The global database 112 stores the IT information that is shared between the enterprise environments. The information is obtained from and sent to the appliances 106 in the various enterprise environments. The information can also be obtained from users interacting directly with the IT information server 102 as described below.

Some of the information sharing between appliances 106 can be automated. In one embodiment, an appliance 106 scans managed endpoints 108 and determines information about the endpoint objects running on the managed endpoints. This information is provided to the IT information server 102, stored in the global database 112, and shared with other appliances 106. The information is then available to IT staffs of other enterprises 110 that are installing or operating the same endpoint objects. The shared information may also be integrated with the management functions of the appliances 106. For example, when the appliance operator issues a command to the appliance 106 to deploy a particular software program on certain managed endpoints 108, the appliance can retrieve information about the software program from the global database 112 of the IT information server 102 and present that information to the appliance operator or use the information to automatically perform the deployment.

Figure 2:
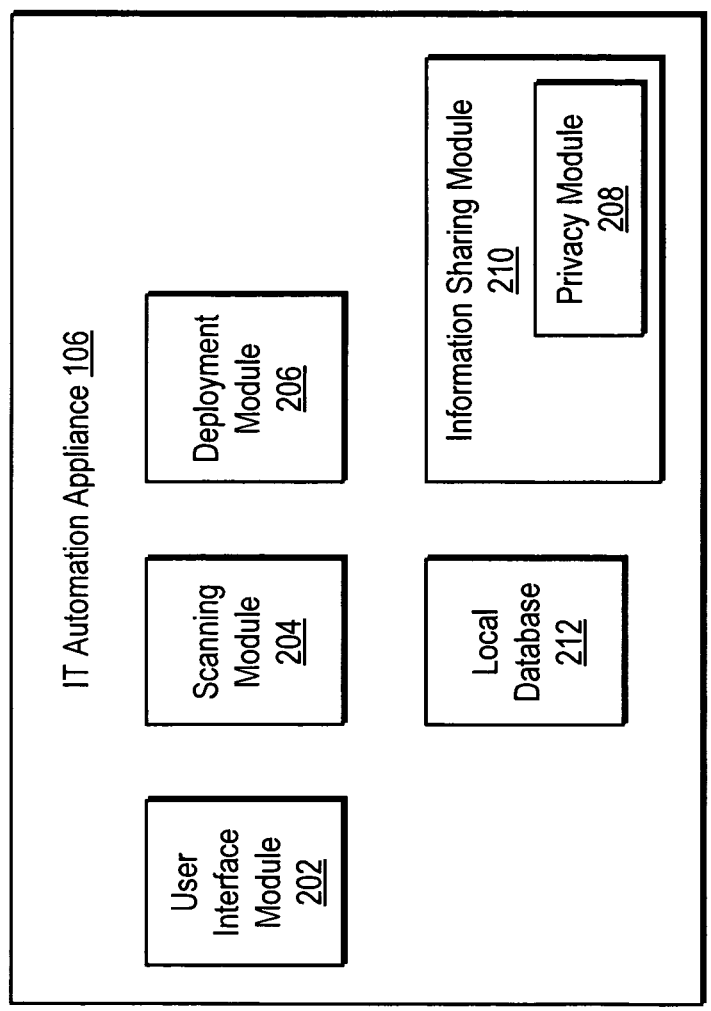
FIG. 2 is a block diagram illustrating a logical view of the appliance, in one embodiment.

FIG. 2 is a block diagram illustrating a logical view of the appliance 106, in one embodiment. As mentioned above, the appliance 106 manages the managed endpoints 108 in an enterprise environment 110 and shares IT information through an IT information server 102. The appliance operator, generally a member of the IT staff of the enterprise environment 110, interacts with the appliance 106 through the user interface module 202. The user interface module 202 may provide a graphical interface that enables the appliance operator to scan the managed endpoints 108, schedule deployments of software to the managed endpoints, input IT information, or retrieve IT information such as that provided by other enterprise environments 110 to the IT information server 102. The appliance operator may access the user interface remotely, through an administrator client that communicates with the appliance 106. In one embodiment, the appliance 106 provides the user interface through a web interface and includes a web server.

The scanning module 204 scans the managed endpoints 108 in the enterprise environment 110. The scan retrieves various information about the endpoint objects on the managed endpoints 108. The information about the endpoint objects is stored in the local database 212. Various types of information about the endpoint objects can be obtained, such as the name, version, size, and file location of the object. This information can be obtained, for example, from the file system or the operating system process table of the managed endpoint 108. In one embodiment, an agent program runs on the managed endpoint 108 to assist the appliance 106 in scanning the endpoint.

A scan may be performed periodically or may be performed on demand based on a command initiated by an appliance operator. The results of the scan, stored as local database 212, are presented by the user interface module 202. In one embodiment, the user interface module 202 enables the appliance operator to view all of the endpoint objects in the enterprise environment 110, all of the endpoint objects on a particular managed endpoint 108, or particular types of endpoint objects. The user interface module 112 also presents information associated with the endpoint objects.

In addition, the user interface module 202 enables the appliance operator to attach additional information to the endpoint objects. For example, the appliance operator may navigate to a page displaying information about an endpoint object and enter further information about the object in an input field. This entered information is stored in the local database 212. The information can include instructions for installing or operating the endpoint object. After this information is entered, when the endpoint object is found in subsequent scans or on different managed endpoints 108, this entered information is displayed in addition to the information obtained from the managed endpoint. The user interface module 202 also allows searches for endpoint object information, such as a search by name, and displays information about the endpoint objects in the result set.

The deployment module 206 deploys endpoint objects to the managed endpoints 108. Deployments include software installations and software or system configuration changes. A deployment can be scheduled to occur automatically or can be performed on demand based on a command from the appliance operator. In one embodiment, the appliance operator initiates deployments through the user interface module 202 by searching for a particular endpoint object, viewing its associated information, and then issuing a command to deploy it on certain managed endpoints 108. The associated information is obtained from the local database 212. The associated information may contain detailed installation instructions previously entered by the appliance operator, such as command line options to be used with an installation program. This information can be incorporated into the deployment command or used to automate deployment.

The information sharing modules 210 share IT information with the IT information server 102. As part of this sharing, the information sharing modules 210 send information from the local database 212 to the global database 112 in the IT information server 102. The local database 212 includes information obtained from scans of the managed endpoints 108 and additional information added through the user interface module 202 by the appliance operator as described above. In one embodiment, information is sent from the appliance 106 to the IT information server 102 periodically. Information can also be sent whenever new information is added to the local database 212. The IT information server 102 may periodically poll the appliances 106 for new information.

In one embodiment, the privacy module 208 restricts the information that is sent from the local database 212 to the IT information server 102. The appliance operator may not want certain information to be sent to the IT information server 102 and made available to other enterprise environments 110. The privacy module 208 allows configuration of the types of information that is sent to the IT information server 102. For example, only information about certain classes of endpoint objects (e.g., word processing applications) may be sent. In another example, only certain kinds of information (e.g., installation notes) about endpoint objects may be sent. In one embodiment, the IT information server 102 restricts the information that the appliance 106 receives based on the amount of information that the appliance provides. This may be used to prevent an appliance 106 from receiving information without providing information. The privacy module 208 may also specify that certain information be provided to the IT information server 102, but only anonymously. In one embodiment, information is not sent to the IT information server 102 by default, but the appliance operator can specify specific items to send to the IT information server.

The information sharing modules 210 of the appliances 106 also receive information from the IT information server 102. In one embodiment, the appliances query the IT information server 102 for information when needed. For example, when the appliance operator requests information about an endpoint object for a deployment, the information sharing module 210 queries the IT information server 102 for information about that endpoint object. The query can include the name and version of the endpoint object. Upon receiving the information, the information sharing module 210 combines the received information with information from the local database 212, and displays the result to the appliance operator through the user interface module 202. In one embodiment, the displayed result identifies the sources of the information. Information is identified as being either automatically generated from a scan, manually entered into the appliance 106, or received from the IT information server 102. The specific enterprise environment 110 that provided the information to the IT information server 102 may also be identified. The appliance operator may then initiate the deployment, incorporating information from all sources in the deployment instructions.

Information received by the appliance 106 from the IT information server 102 is automatically grouped and integrated with existing information about the appropriate endpoint objects, so the information is easily accessed by the appliance operator interested in a particular endpoint object. In one embodiment, the information sharing module 210 periodically queries the IT information server 102 to receive any information for endpoint objects currently described in the local database 212. The information sharing module 210 also periodically sends any recently added information to the IT information server 102. In one embodiment, the IT information server 102 initiates the information sharing.

Figure 3:
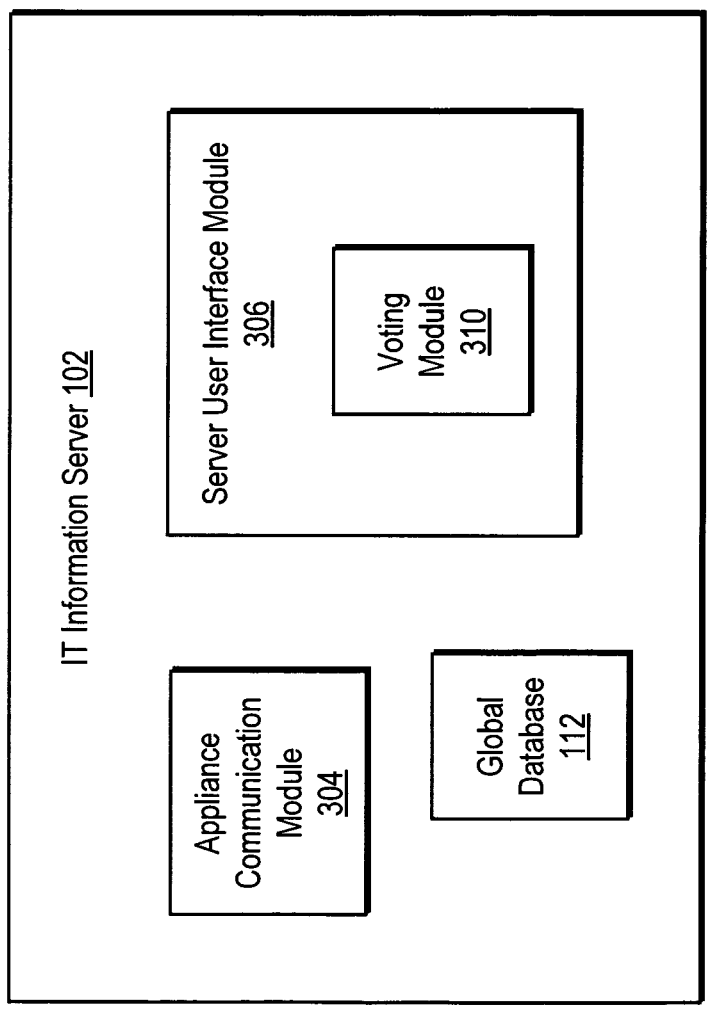
FIG. 3 is a block diagram illustrating a logical view of the IT information server, in one embodiment.

FIG. 3 is a block diagram illustrating a logical view of the IT information server 102, in one embodiment. As mentioned above, the IT information server 102 facilitates the sharing of IT information between appliances 106 in multiple enterprise environments 110. The IT information server 102 communicates with the information sharing modules 210 of the individual appliances 106 through the appliance communication module 304. The appliance communication module 304 generally receives information about endpoint objects and stores the information in the global database 112. The appliance communication module 304 also sends information from the global database 112 to the appliances 106.

In one embodiment, the IT information server 102 includes a server user interface module 306 for providing direct access to the global database 112. The server user interface module 306 provides an interface for users such as the IT staff of an enterprise environment 110. In one embodiment, the server user interface module 306 provides a web-based user interface and includes a web server. The server user interface 306 may permit users to browse information about various endpoint objects or to search for information on particular endpoint objects. The server user interface 306 also permits users to provide additional information about various endpoint objects, such as installation or operation instructions or other comments about the endpoint objects. The information is provided through a web form, for example. This information is then included in the global database 112, possibly after being approved by an operator of the IT information server 102.

The server user interface module 306 may also include a voting module 310 that allows users to rate, or vote on, various endpoint objects. For example, users are allowed to vote on whether a particular endpoint object is spyware on a scale of 1 to 5, where 1 is "extensive spyware" and 5 is "not spyware". The results of the vote are stored in the global database 112 and are provided to the appliances 106 along with the other information in the global database. In one embodiment, appliance operators can vote using the voting module 310 through the user interface module 202 of the appliance 106.

Figure 4:
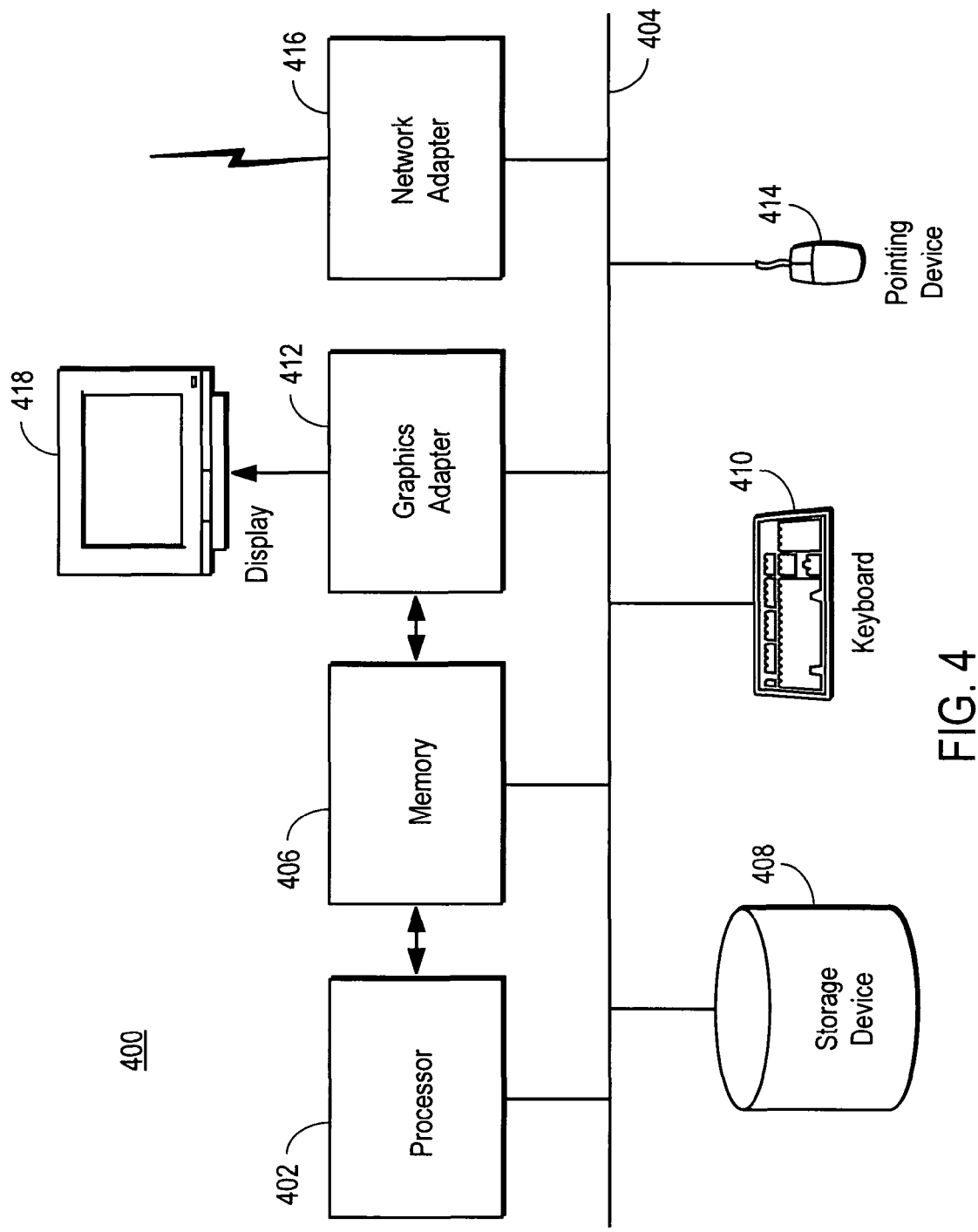
FIG. 4 is a block diagram illustrating a computer that can serve as an embodiment of an IT automation appliance, a managed endpoint, or an IT information server, in one embodiment.

FIG. 4 is a block diagram illustrating a computer 400 that can serve as an embodiment of an IT automation appliance 106, a managed endpoint 108, or an IT information server 102, in one embodiment. Illustrated are at least one processor 402 coupled to a bus 404. Also coupled to the bus are a memory 406, a storage device 408, a keyboard 410, a graphics adapter 412, a pointing device 414, and a network adapter 416. A display 418 is coupled to the graphics adapter 412. The storage device 408 is a device such as a hard drive, CD or DVD drive, or flash memory device, and holds files containing executable code and/or data utilized during the operation of the computer 400. The memory 406, in one embodiment, is a random access memory (RAM) and holds instructions and data loaded from the storage device 408, generated during processing, and/or from other sources.

Computers acting in different roles may have different and/or additional elements than the ones shown in FIG. 4. For example, a computer 400 acting as the IT information server 102 may have greater processing power and a larger storage device than a computer acting as a managed endpoint 108. Likewise, a computer 400 acting as the IT information server 102 may lack devices such as a display 418 and/or keyboard 410 that are not necessarily required to operate it.

The computer 400 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 408, loaded into the memory 406, and executed by the processor 402. A module can include one or more processes, and/or be provided by only part of a process.

FIG. 5 illustrates a portion of a screen displayed to an appliance operator, in one embodiment. The screen displays information helpful for deploying and managing an endpoint object, in this case the software program Adobe Acrobat 8 Standard. The user interface module 202 obtains the information displayed on the screen from the local database 212. As mentioned above, this information can be obtained from multiple sources. For example, the Name, Publisher, Software Version, and Filename information is obtained automatically during a scan of a managed endpoint 108. The scan obtains the information from the file system or the operating system process table of the managed endpoint 108, in one embodiment. Some information may have been input by an appliance operator, such as the Readme File and the Quiet Install Command. Further, some information may have been obtained from the IT information server 102, such as the Description, Software Category, and Software Threat. The Software Category and Software Threat display the results of a vote taken by the voting module 310. For example, 75% of users voted the software as being in the Business category.

A display similar to the one illustrated in FIG. 5 may include an indication of the source of each piece of information displayed. For example, in FIG. 5, the information obtained from the IT information server 102 is indicated by an asterisk displayed to the user. The display may also include user interface features such as buttons or input forms for allowing input of additional data by the appliance operator. An example is the "Edit Information" button in FIG. 5. As described above, information added through the user interface module 202 is stored in the Local database 212 and may be sent to the IT information server 102. The user interface module 202 beneficially allows the appliance operator to view information about the software program from a variety of sources and to input information that becomes shared with other enterprise environments 110. The user interface module 202 may also allow the appliance operator to browse various endpoint objects or search for a particular endpoint object.

Figure 6:
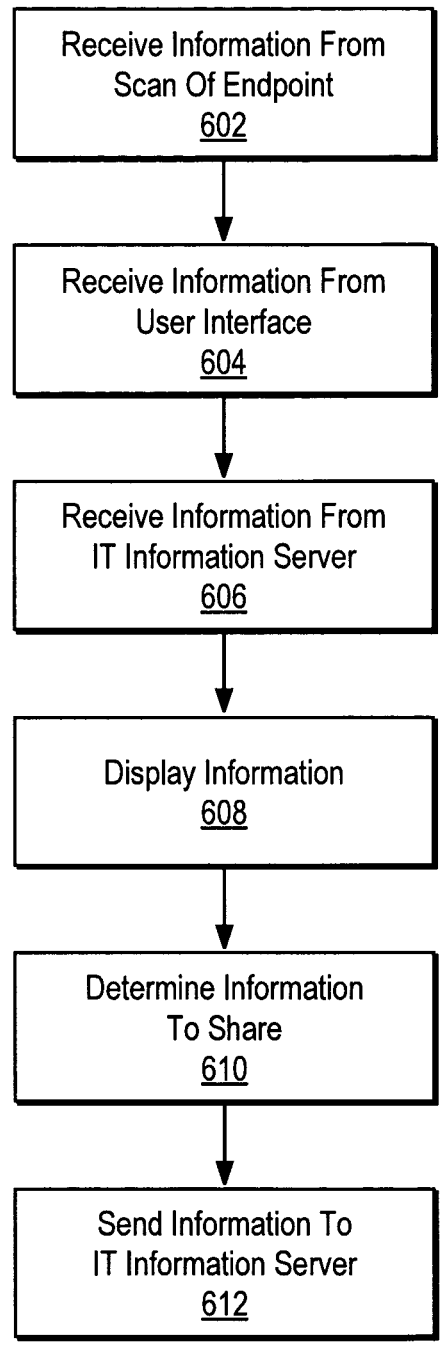
FIG. 6 is a flowchart illustrating a method of sharing IT information.

FIG. 6 is a flowchart illustrating a method of sharing IT information. The scanning module 204 on an appliance 106 receives 602 information about an endpoint object from a scan of a managed endpoint 108. The user interface module 202 receives 604 additional information about the endpoint object from an appliance operator. The information sharing module 210 receives 606 further information about the endpoint object from an IT information server 102. The received information from the different sources is stored in the local database 212 and combined and displayed 608 by the user interface module.

Endpoint object information received from the scan or from the user interface may also be shared with other enterprise environments 110 through the IT information server 102. The privacy module 208 determines 610 which information is shared based on policies input to the appliance 106. The shared information is then sent 612 to the IT information server where it is distributed to other enterprise environments 110.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A computer-implemented method for sharing information technology (IT) information, the method comprising:
   receiving scan information about an endpoint object configured to run on a managed endpoint in an enterprise environment, the scan information obtained from a scan of the managed endpoint;
   receiving external information about the endpoint object, the external information received from an information source outside of the enterprise environment;
   combining the scan information and external information to produce integrated information; and
   displaying the integrated information on a user interface.

2. The computer-implemented method of claim 1, wherein the endpoint object is a software application.

3. The computer-implemented method of claim 1, further comprising:
   storing the integrated information in a storage device on a management computer in the enterprise environment.

4. The computer-implemented method of claim 1, further comprising:
   receiving user-provided information about the endpoint object from the user interface; and
   including the user-provided information in the integrated information.

5. The computer-implemented method of claim 1, further comprising:
   sending at least a portion of the integrated information to a computer outside of the enterprise environment, the integrated information to be shared with users of other enterprise environments.

6. The computer-implemented method of claim 1, further comprising:
   determining a portion of the integrated information for sharing with other enterprise environments based at least in part on a privacy policy of the enterprise environment.

7. The computer-implemented method of claim 1, wherein the external information comprises voting information based on a result of a vote about the endpoint object.

8. A computer program product having a non-transitory computer-readable storage medium having executable computer program instructions recorded thereon for sharing information technology (IT) information, comprising:
   a scanning module for receiving scan information about an endpoint object configured to run on a managed endpoint in an enterprise environment, the scan information obtained from a scan of the managed endpoint;
   an information sharing module for receiving external information about the endpoint object, the external information received from an information source outside of the enterprise environment;
   a local database module for combining the scan information and external information to produce integrated information; and
   a user interface module for displaying the integrated information on a user interface.

9. The computer program product of claim 8, wherein the endpoint object is a software application.

10. The computer program product of claim 8, wherein the local database module is further configured for storing the integrated information in a storage device on a management computer in the enterprise environment.

11. The computer program product of claim 8, wherein the local database module is further configured for receiving user-provided information about the endpoint object from the user interface and for including the user-provided information in the integrated information.

12. The computer program product of claim 8, wherein the user interface module is further configured for sending at least a portion of the integrated information to a computer outside of the enterprise environment, the integrated information to be shared with users of other enterprise environments.

13. The computer program product of claim 8, further comprising:
   a privacy module for determining a portion of the integrated information for sharing with other enterprise environments based at least in part on a privacy policy of the enterprise environment.

14. The computer program product of claim 8, wherein the external information comprises voting information based on a result of a vote about the endpoint object.

15. A system having a processor for sharing information technology (IT) information, comprising:

a non-transitory computer-readable storage medium storing computer program modules executable on the processor comprising:

a module for receiving IT information about an endpoint object from computers in a plurality of enterprise environments, the IT information comprising information obtained from scans of managed endpoints in the plurality of enterprise environments;

a module for receiving a request for IT information about the endpoint object from a computer; and a module for sending IT information about the endpoint object to the computer in response to the request.

16. The system of claim 15, wherein the endpoint object is a software application.

17. The system of claim 15, further comprising:
a server user interface module for receiving IT information about the endpoint object from a user, the server user interface module further configured for providing a user interface to the user.

18. The system of claim 15, further comprising: a global database for storing the received IT information.

19. The system of claim 15, further comprising:
a voting module for:
polling a plurality of users for information about the endpoint object; receiving a plurality of responses from the plurality of users; and presenting a summary of the plurality of responses.

* * * * *